April 28, 1964 R. ADLER ETAL 3,131,359

RESONANT QUADRUPOLE PUMP

Original Filed May 18, 1962

INVENTORS
Robert Adler
George H. Ryan
By Francis W. Crotty
Atty.

3,131,359

RESONANT QUADRUPOLE PUMP

Robert Adler, Northfield, and George H. Ryan, Fox River Grove, Ill., assignors to Zenith Radio Corporation, Chicago, Ill., a corporation of Delaware Continuation of application Ser. No. 195,800, May 18, 1962. This application Apr. 23, 1963, Ser. No. 275,803
11 Claims. (Cl. 330—4.7)

The present invention is directed to an electron-beam parametric amplifier and is addressed most particularly to the modulation expander or pump structure characteristically included in such an amplifier. This application is a continuation of application Serial No. 195,800 filed May 18, 1962 by the same inventors and assigned to the same assignee.

An electron-beam parametric amplifier is a low-noise device which exhibits outstanding properties in addition to its low-noise factor. Among other things, it has unique stability, being free from feedback effects, and has extraordinary freedom from damage attributable to overload. As presently constructed and employed, it is popularly referred to as a "quadrupole amplifier" and has been described, for example, in the Proceedings of the Institute of Radio Engineers, vol. 46, No. 10, October of 1958. The quadrupole amplifier is described and claimed in the co-pending application of Glen Wade, Serial No. 747,764, filed July 10, 1958, entitled Parametric Amplifier, and assigned to the same assignee as the present invention.

The quadrupole amplifier comprises an electron gun for producing a beam which flows successively through an input coupler, an amplifying region and an output coupler. The entire beam is immersed in a uniform magnetic field and flows parallel to the flux lines. While subject to various modes of operation, it is frequently operated with a magnetic field intensity such that the cyclotron frequency is approximately equal to the frequency of the signal to be amplified and with a pump frequency of twice the signal frequency. This is known as the degenerate mode and features the use of an input coupler of the Cuccia type which serves two important functions. It demodulates the beam as far as the entering fast-wave component of beam noise is concerned and at the same time it modulates the beam with a new fast wave representing the input signal to be amplified.

In the amplifying region, the beam passes through a quadrupole structure which is fed with the pumping signal to establish a time-variable non-homogeneous field, varying at twice the cyclotron frequency. The effect of the quadrupole field on the beam is a parametric amplification of the beam modulation and the amplified fast-wave signal modulation is extracted from the beam by the output coupler, which is also of the Cuccia type, for application to a load.

The present invention is concerned with the structure of the quadrupole or modulation expander which amplifies the signal modulation of the beam. As the name implies, the quadrupole structure includes four similar electrodes placed symmetrically about the tube axis and the electrodes are so shaped that the transverse cross-sections of the structure through all points of the axis are identical. One pair of the electrodes, which are in space opposition to one another, are tied together and the remaining pair of electrodes are likewise tied together and the output terminals of the pump signal source connect with these two pairs of electrodes. It is required that the configuration of the electrodes result in equi-potential planes near the axis having the form of equi-lateral hyperbolae. If the electrodes themselves are shaped as equi-lateral hyperbolae, equi-potentials of this desired configuration are established not only near the axis but throughout the amplifying space enclosed by the quadrupole structure.

For this reason, as explained in the above-mentioned IRE paper, the pump structure initially employed electrodes that were shaped to simulate equi-lateral hyperbolae. While this structure has worked satisfactorily, it is desirable to arrange the quadrupole for ease of manufacture and assembly while preserving the desired configuration of the pumping field. This is a principal object of the subject invention.

Another specific object of the invention is to provide a tuned quadrupole structure for a parametric amplifier constructed of simple, conductive elements to be free of the adverse effects of wall charges.

In practicing the invention, the resonant quadrupole pump structure of a parametric amplifier comprises four conductive rods constituting the principal distributed capacitance of the structure and enclosing a path for a signal modulated electron beam. At least one conductive disc, but usually two such discs are associated with the rods to support them in a mechanical assembly. Each such disc has four fingers directed radially inwardly and the discs circumscribe the conductors of the quadrupole with the fingers of each disc conductively and mechanically connected to those conductors, respectively. The conductive disc constitutes an inductance which establishes, in conjunction with the capacitance contributed by the rods, a resonant frequency for the pump structure corresponding to the frequency of the pump signal which is to drive the structure. A first conductive strap is bridged across a pair of the conductors which are in space-opposed relation and a second conductive strap is bridged across the remaining pair of conductors. As one way of making a driving connection, a pair of lead-in conductors are coupled to and extend from the conductor pairs for connection to opposite polarity terminals of the pump signal source.

The features of the present invention which are believed to be novel are set forth with particularity in the appended claims. The organization and manner of operation of the invention, together with further objects and advantages thereof, may best be understood by reference to the following description taken in conjunction with the accompanying drawing, in which:

Figure 1:
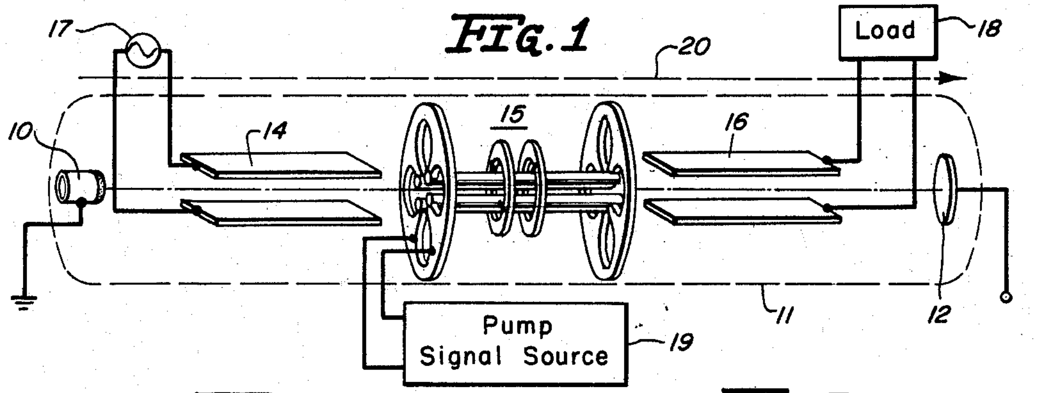
FIGURE 1 is a schematic representation of an electron beam parametric amplifier including a tuned quadrupole structure embodying the invention.

Referring now more particularly to FIGURE 1, the electron-beam parametric amplifier there illustrated comprises an electron-gun 10 for producing an electron beam directed along the axis of a tube envelope 11 to a collector or anode 12. The structure of the gun is entirely conventional and constitutes no part of the present invention. Therefore, it has been represented schematically. Interposed between the gun or beam source 10 and anode 12 are an input coupler 14, a resonant quadrupole pump structure or modulation expander 15, and an output coupler 16. The couplers 14 and 16 are identical and are of the Cuccia type, individually comprising a pair of plates symmetrically disposed on opposite sides of the tube axis. The structure of pump 15 will be considered in detail hereafter.

An input signal source 17 is coupled, with due regard for impedance matching, to input coupler 14 while a load 18 is connected to output coupler 16, again with due regard for impedance matching. A pump signal source 19, having a predetermined operating frequency and terminal impedance, is conductively connected with pump structure 15 to drive the pump structure as required to achieve amplification. Of course, the beam is immersed in a magnetic field, represented symbolically by arrow 20, chosen to establish the desired cyclotron frequency for the amplifier.

Since the quadrupole amplifier is known and has been described, for example, in the above-identified IRE paper, it has been shown schematically and its operation will be considered in cursory fashion. The electron beam developed at gun 10 and directed toward anode 12 enters the field of input coupler 14 where fast-wave noise components are extracted and where the signal to be amplified is impressed upon the beam. The signal-modulated beam then enters the amplifying region which is the space enclosed within pump structure 15 and in this region it is subjected to the influence of a pumping field which for the degenerate type of operation is an alternating field of twice the signal frequency. The effect of the pump field is to expand the signal modulation of the beam so that as the beam emerges from the pump structure and enters the field of output coupler 16 the amplified signal is taken off and applied to load 18.

Figure 2:
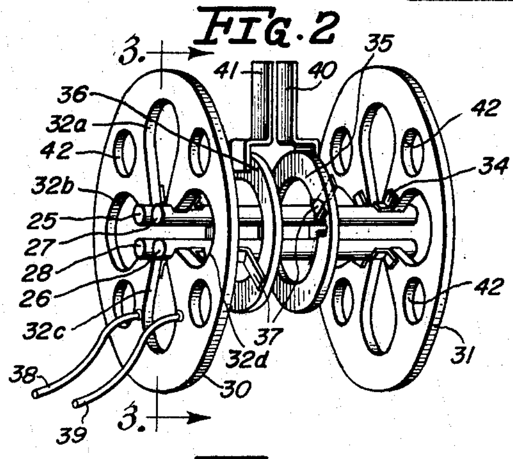
FIGURES 2 and 3 are detailed views of the quadrupole structure of the amplifiers.
Figure 3:
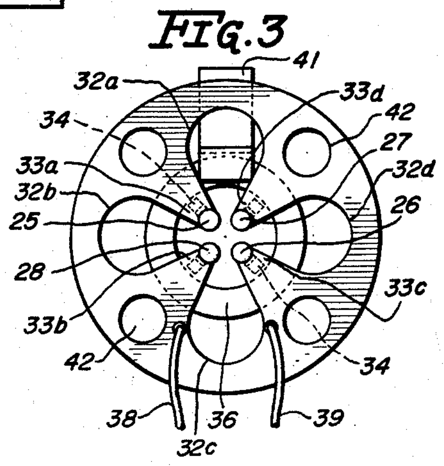

More particular attention will now be given to the structure of the pump with special reference to the detailed views of FIGURES 2 and 3. It has been discovered that an optimum approach to the desired hyperbolic field may be attained in a linear quadrupole structure through the use of four straight cylindrical conductors arranged parallel to each other in a quadratic pattern with such spacing that the ratio of the conductor diameter to the diameter of the inscribed circle defined by the conductors is approximately 1.2. Accordingly, pump structure 15 includes four similar elongated cylindrical conductive rods 25–28 arranged parallel to one another and enclosing an elongated path along which the signal modulated electron beam passes in its travel from electron gun 10 to collector 12. The conductors collectively define a section of four-element transmission line. While the length of the line in terms of the free space wavelength corresponding to the pump frequency is not critical, it may be assumed initially that the transmission line section has a length very much less than ¼ of that wavelength.

The four conductors of the quadrupole are mechanically retained in their desired topographical arrangement by a plurality of similar conductive discs, individually having four fingers directed radially inward and circumscribing the conductors with the fingers of each disc conductively and mechanically connected to the conductive rods. More specifically, two discs 30 and 31 are included in the pump structure near the opposite ends of rods 25–28. Each such disc has four cut-out sections 32*a*–32*d* simulating four single-turn inductors and terminating in four fingers directed radially inward. The fingers are designated 33*a*–33*d* and they have equal radial spacings from the center of the disc. That spacing is chosen so that with the discs circumscribing the conductors and the fingers of the discs mechanically connected thereto, the aforementioned ratio of rod diameter to the diameter of the inscribed circle is attained. L-shaped connectors 34 may be utilized to effect strong mechanical and good electrical connections between the fingers of each disc and the associated quadrupole rods. Electrically, the discs constitute parallel-connected inductances which, in conjunction with the capacitance contributed largely by rods 25–28, establish a resonant frequency for the pump structure which corresponds to the frequency of the pump signal delivered from source 19. The inductance is principally determined by the radially directed fingers of the discs so that the magnitude of inductance may be controlled by appropriately dimensioning the cut-out sections which form such fingers.

In exciting the pump structure, the rods are driven in pairs in the pi or quadrupole mode. To assure the desired mode of excitation, straps 35 and 36 are associated with the quadrupole rods to suppress certain undesired modes, of which the structure is capable, by shifting the frequency at which the unwanted modes may occur to a value far from the pump frequency. As shown, the straps take the form of conductive rings encircling the quadrupole conductors in parallel relation to and in the space between discs 30 and 31. L-shaped connectors 37 may be employed to connect each ring with its conductor pair. Ring 35 is thus bridged across conductors 27 and 28 while ring 36 is bridged across conductors 25 and 26.

A pair of lead-in conductors are coupled to and extend electrically from the conductor pairs of the quadrupole for connection to opposite-polarity terminals of signal source 19. While the driving connection may be made in a variety of ways, as illustrated, lead-in conductors 38 and 39 are conductively connected to points chosen along one of the simulated single-turn inductors of conductive disc 30 which represent an impedance that matches the terminal impedance of the pump signal source.

It may be desirable to have some convenient adjustment of resonant frequency and this may be attained by including a trimmer capacitor within the pump structure. As shown in FIGURE 2, the trimmer comprises a pair of flexible electrodes 40, 41 supported by straps 35, 36 and constructed of sufficiently thin metal stock to permit capacitive adjustments by bending the electrodes closer to or farther from one another.

The quadrupole structure may be retained in a desired position within the envelope of the amplifier by mounting holes 42 cut in each of discs 30, 31 and arranged in axial alignment to support rods (not shown) which are also employed to mount other components of the amplifier such as couplers 14, 16 and various electrodes of the electron gun and the like.

Figures 4, 5:
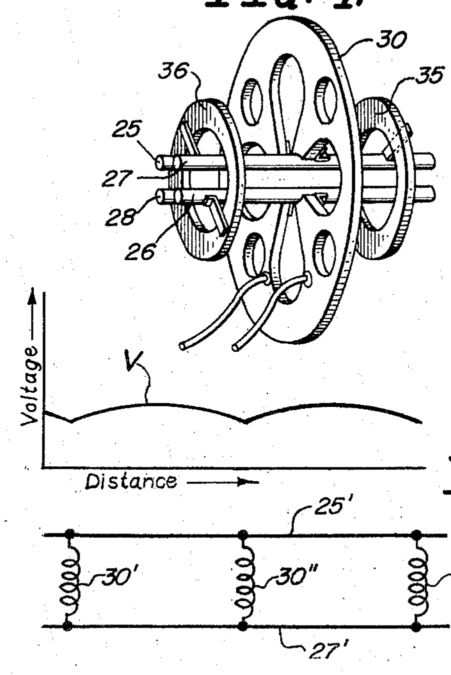
FIGURES 4, 5 and 6 show modified versions of the quadrupole.

The desicrbed structure may be characterized as a tuned quadrupole in that the inductance of discs 30, 31 tune the structure to the frequency of the pumping signal supplied by source 19. If the length of the quadrupole is very small relative to one-quarter of the free space wavelength corresponding to the pumping frequency, as assumed initially, the voltage distribution along the quadrupole is substantially uniform and the pump source may be connected at any location. For example, a single disc 30 may be used, positioned at the center of the quadrupole in the manner represented in FIGURE 4. For mechanical reasons, however, it is preferred that a pair of discs be employed as shown in FIGURE 2.

As stated above, the length of the pump structure is not critical; usually it is determined by the amount of gain required of the amplifier. If the length of the pump structure approaches one-quarter wavelength, positioning conductive discs 30, 31 at the ends of the rods avoids voltage nodes and establishes a useful intensity of pumping field throughout the entirety of the beam path through the pump structure.

The quadrupole may even be longer than one-half the free space wavelength of the pumping frequency if required. In such a case a plurality of conductive discs are spaced along the structure in a manner represented schematically in FIGURE 5 where, for convenience, the quadrupole conductors are represented by transmission line 25′, 27′ and the conductive discs are represented by inductances 30′, 30″ and 30‴. The curve V drawn above transmission line 25′, 27′ represents the pump voltage distribution along the quadrupole. The voltage distribution pump pattern may be controlled by the location of the conductive discs which preferably are placed so that there are no nodes or null points for the pump signal along the quadrupole. To this end, discs are spaced less than one-half free-space wavelengths apart. Disc 30″ is located at the center of the structure and two maximum voltage points occur at two points equi-distant from disc 30″.

Figure 6:
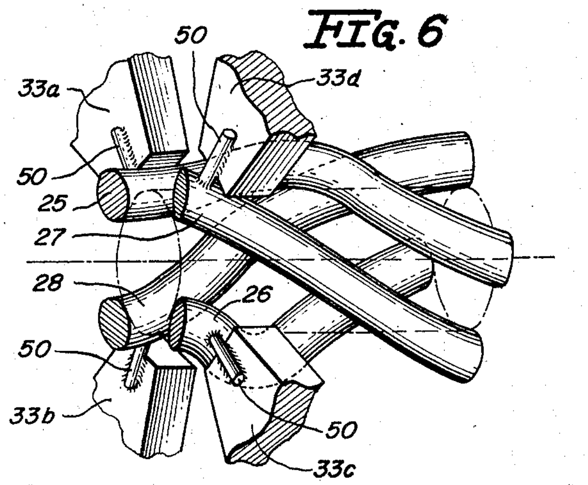

As explained, the amplifier of FIGURE 1 features a pumping frequency of twice the signal frequency and this is known as the degenerate mode of operation. For non-degenerate amplification, the pump signal frequency may be substantially different from the signal frequency and in that case pump structure 15 may feature a twisted quadrupole of the type shown in the fragmentary view of FIGURE 6. Depending on the direction of twist, the pump signal frequency may be either higher or lower than the value for degenerate operation, and may, for example, be 4 or 5 times the signal frequency. In certain non-degenerative applications, the input and output Cuccia couplers desirably may be replaced with distributed structures such as transmission lines. Physically, the pump structure is the same as in FIGURE 2 except that rods 25–28 are twisted to have the shape of helices. The same type of disc and strap construction may be employed with the twisted quadrupole although it may be convenient in this case to provide conductive pins 50 with one end welded to the quadrupole conductors and the other end welded to the conductive supporting discs or conductive strap elements. With the twisted quadrupole construction the quadrupole conductors are in effect tilted and the cross-section of each conductor becomes more elliptical than circular. The curvature is therefore less in the region closest to the quadrupole axis and the conductor diameter is determined empirically to achieve the optimum approach to the desired hyperbolic pumping field.

The pump structure shown and described greatly simplifiers, the fabrication of the pump and improves the performance of the tube. The pump structure is entirely conductive, at least within the region of the beam path and therefore wall charges which may introduce undesirable effects are avoided. The symmetry and simplicity of the parts of which the pump is constructed facilitates fabrication of the components as well as the integrated pump assembly.

While particular embodiments of the invention have been shown and described, it will be obvious to those skilled in the art that changes and modifications may be made without departing from the invention in its broader aspects, and, therefore, the aim in the appended claims is to cover all such changes and modifications as fall within the true spirit and scope of the invention.

We claim:

1. In an electron beam parametric amplifier having a pump signal source of a predetermined frequency, a resonant quadrupole-type pump structure comprising:
four similar conductive rods constituting the principal distributed capacitance of the pump structure and enclosing a path for an electron beam;
at least one conductive disc having four fingers directed radially inward and circumscribing said conductors with the fingers of said disc conductively and mechanically connected to said conductors, respectively, and constituting an inductance for establishing with said capacitance a resonant frequency for the pump structure corresponding to said predetermined frequency;
and means for coupling space-opposed pairs of said conductors to opposite-polarity terminals of said pump signal source.

2. In an electron beam parametric amplifier having a pump signal source of a predetermined frequency, a resonant quadrupole-type pump structure comprising:
four similar conductive rods constituting a principal distributed capacitance of the pump structure and enclosing a path for an electron beam;
at least one conductive disc having four cut-out sections simulating single-turn inductors and terminating in four fingers directed radially inward, circumscribing said conductors with the fingers of said disc conductively and mechanically connected to said conductors, respectively, and constituting an inductance for establishing with said capacitance a resonant frequency for the pump structure corresponding to said predetermined frequency;
a first conductive strap bridged across a pair of said conductors which are in space-opposed relation and a second conductive strap bridged across the remaining pair of said conductors;
and means for coupling said conductor pairs to opposite-polarity terminals of said pump signal source.

3. In an electron beam parametric amplifier having a pump signal source of a predetermined frequency, a resonant quadrupole-type pump structure comprising:
four similar conductive rods constituting a principal distributed capacitance of the pump structure and enclosing a path for an electron beam;
a pair of similar conductive discs, individually having four fingers directed radially inward, circumscribing said conductors near the opposite ends thereof with the fingers of each of said discs conductively and mechanically connected to said conductors, respectively, and constituting an inductance for establishing with said capacitance a resonant frequency for the pump structure corresponding to said predetermined frequency;
a first conductive strap bridged across a pair of said conductors which are in space-opposed relation and a second conductive strap bridged across the remaining pair of said conductors;
and means for coupling said conductor pairs to opposite-polarity terminals of said pump signal source.

4. In an electron beam parametric amplifier having a pump signal source of a predetermined frequency, a resonant quadrupole-type pump structure comprising:
four similar conductive rods constituting a principal distributed capacitance of the pump structure and enclosing a path for an electron beam;
a pair of similar conductive discs, individually having four fingers directed radially inward, circumscribing said conductors near the opposite ends thereof with the fingers of each of said discs conductively and mechanically connected to said conductors, respectively, and constituting an inductance for establishing with said capacitance a resonant frequency for the pump structure corresponding to said predetermined frequency;
a first conductive strap bridged across a pair of said conductors which are in space-opposed relation and a second conductive strap bridged across the remaining pair of said conductors;
and a pair of conductors conductively connected to and extending from one of said discs for coupling to opposite-polarity terminals of said pump signal source.

5. In an electron beam parametric amplifier having a pump signal source of a predetermined frequency and terminal impedance, a resonance quadrupole-type pump structure comprising:
four similar conductive rods constituting a principal distributed capacitance of the pump structure and enclosing a path for an electron beam;
a pair of similar conductive discs, individually having four cut-out sections simulating single-turn inductors and terminating in four fingers directed radially inward, circumscribing said conductors near the opposite ends thereof with the fingers of each of said discs conductively and mechanically connected to said conductors, respectively, and constituting an inductance for establishing with said capacitance a resonant frequency for the pump structure corresponding to said predetermined frequency;
a first conductive strap bridged across a pair of said conductors which are in space-opposed relation and a second conductive strap bridged across the remaining pair of said conductors;
and a pair of conductors conductively connected to and extending from two points on one of said cut-out sections selected for coupling to opposite-polarity terminals of said pump signal source with substantial impedance match.

6. In an electron beam parametric amplifier having a pump signal source of a predetermined frequency, a resonant quadrupole-type pump structure comprising:

four similar conductive rods constituting a principal distributed capacitance of the pump structure and enclosing a path for an electron beam;

a pair of similar conductive discs, individually having four fingers directed radially inward, circumscribing said conductors near the opposite ends thereof with the fingers of each of said discs conductively and mechanically connected to said conductors, respectively, and constituting an inductance for establishing with said capacitance a resonant frequency for the pump structure corresponding to said predetermined frequency;

a pair of conductive rings encircling said conductors, positioned parallel to and between said discs with one of said rings conductively connected to a pair of said conductors which are in space-opposed relation and the other of said rings conductively connected to the other pair of said conductors;

and means for conductively coupling said conductor pairs to opposite-polarity terminals of said pump signal source.

7. In an electron beam parametric amplifier having a pump signal source of a predetermined frequency, a resonant quadrupole-type pump structure comprising:

four similar conductive rods constituting a principal distributed capacitance of the pump structure and enclosing a path for an electron beam;

a pair of similar conductive discs, individually having four cut-out sections simulating single-turn inductors and terminating in four fingers directed radially inward, circumscribing said conductors near the opposite ends thereof with the fingers of each of said discs conductively and mechanically connected to said conductors, respectively, and constituting an inductance for establishing with said capacitance a resonant frequency for the pump structure corresponding to said predetermined frequency, said discs having aligned holes for receiving rods for supporting the pump structure within the amplifier;

a first conductive strap bridged across a pair of said conductors which are in space-opposed relation and a second conductive strap bridged across the remaining pair of said conductors;

and means for coupling said conductor pairs to opposite-polarity terminals of said pump signal source.

8. In an electron beam parametric amplifier having a pump signal source of a predetermined frequency, a resonant quadrupole-type pump structure comprising:

four similar conductive rods constituting a principal distributed capacitance of the pump structure and enclosing a path for an electron beam;

a pair of similar conductive discs, individually having four fingers directed radially inward, circumscribing said conductors near the opposite ends thereof with the fingers of each of said discs conductively and mechanically connected to said conductors, respectively, and constituting an inductance for establishing with said capacitance a resonant frequency for the pump structure corresponding to said predetermined frequency;

a first conductive strap bridged across a pair of said conductors which are in space-opposed relation and a second conductive strap bridged across the remaining pair of said conductors;

means for coupling said conductor pairs to opposite-polarity terminals of said pump signal source;

and a trimmer capacitor including at least one electrode constructed of flexible conductive material for adjusting said resonant frequency.

9. In an electron beam parametric amplifier having a pump signal source of a predetermined frequency, a resonant quadrupole-type pump structure comprising:

four similar conductive rods constituting a principal distributed capacitance of the pump structure and enclosing a path for an electron beam;

a pair of similar conductive discs, individually having four fingers directed radially inward, circumscribing said conductors near the opposite ends thereof with the fingers of each of said discs conductively and mechanically connected to said conductors, respectively, and constituting an inductance for establishing with said capacitance a resonant frequency for the pump structure corresponding to said predetermined frequency;

a first conductive strap bridged across a pair of said conductors which are in space-opposed relation and a second conductive strap bridged across the remaining pair of said conductors;

means for coupling said conductor pairs to opposite-polarity terminals of said pump signal source;

and a trimmer capacitor comprising a pair of electrodes constructed of flexible conductive material and supported by said straps, respectively, for adjusting said resonant frequency.

10. In an electron beam parametric amplifier having a pump signal source of a predetermined frequency, a resonant quadrupole-type pump structure comprising:

two pairs of similar elongated and parallel conductive rods arranged at right angles to one another, constituting a principal distributed capacitance of the pump structure and enclosing a path for an electron beam;

at least one conductive disc having four cut-out sections simulating single-turn inductors and terminating in four fingers directed radially inward, circumscribing said conductors with the fingers of said disc conductively and mechanically connected to said conductors, respectively, and constituting an inductance for establishing with said capacitance a resonant frequency for the pump structure corresponding to said predetermined frequency;

a first conductive strap bridged across a pair of said conductors which are in space-opposed relation and a second conductive strap bridged across the remaining conductor pair;

and a pair of conductors coupled to and extending from said disc for coupling to opposite-polarity terminals of said pump signal source.

11. In an electron beam parametric amplifier having a pump signal source of a predetermined frequency, a resonant quadrupole-type pump structure comprising:

four similar conductive rods constituting a principal distributed capacitance of the pump structure and enclosing a path for an electron beam;

a plurality of similar conductive discs, individually having four fingers directed radially inward, circumscribing said conductors near the opposite ends thereof with the fingers of each of said discs conductively and mechanically connected to said conductors, respectively, and constituting an inductance for establishing with said capacitance a resonant frequency for the pump structure corresponding to said predetermined frequency;

a first conductive strap bridged across a pair of said conductors which are in space-opposed relation and a second conductive strap bridged across the remaining pair of said conductors;

and means for coupling said conductor pairs to opposite-polarity terminals of said pump signal source, said discs being spaced along said conductors to establish a pattern of voltage distribution for said pump signal having no null points along said path.

No references cited.